United States Patent [19]

Hung-Lin

[11] Patent Number: 5,992,823
[45] Date of Patent: Nov. 30, 1999

[54] STRUCTURE OF A SHUTOFF VALVE

[76] Inventor: Lai Hung-Lin, Suite 2, 7F, No. 95-8, Chang Ping Road, Sec. 1, Taichung, Taiwan

[21] Appl. No.: 08/686,439

[22] Filed: Jul. 25, 1996

[51] Int. Cl.⁶ .................................................. F16K 5/06
[52] U.S. Cl. ................................... 251/315.14; 251/315.1
[58] Field of Search ............................ 251/315.14, 315.1

[56] References Cited

U.S. PATENT DOCUMENTS

| | | | |
|---|---|---|---|
| 1,670,691 | 5/1928 | Riggin | 251/315.14 |
| 3,345,032 | 10/1967 | Rawstron | 251/315.14 X |
| 3,486,736 | 12/1969 | Scaramucci | 251/315.14 |
| 3,678,956 | 7/1972 | Ebin | 251/315.14 X |

FOREIGN PATENT DOCUMENTS 0 433 207   6/1991   European Pat. Off. .......... 251/315.14

*Primary Examiner*—John Fox
*Attorney, Agent, or Firm*—Harrison & Egbert

[57] ABSTRACT

A structurally improved shutoff valve is provided, the shutoff valve comprises a straight or an elbow tubular housing including a water inlet and a water outlet at two ends for respectively connecting a water source and a waterflow pipe therebetween, a valve ball disposed in the housing and operated by a swivel knob for controlling the water flow therethrough, a nipple in cooperation with a retaining ring and a nut to engage the waterflow pipe with the water outlet of the housing. A sealing ring secured to an outer periphery adjacent the forward end of the nipple having a outer diameter slightly larger than that of the outer periphery of the nipple so as to completely prevent the water from leaking out of the valve. Upon this improvement, the engagement of the nipple with the water outlet of the housing will no longer apply the waterproof glue.

2 Claims, 4 Drawing Sheets

STRUCTURE OF A SHUTOFF VALVE

BACKGROUND OF THE INVENTION

The present invention relates to valves and more particularly to a structurally improved shutoff valve which connects between a water source and a supply pipe and the connection does without applying glue so as to ensure a smooth operation of the valve.

A shutoff valve is adapted to control the water flow between a water source and a supply pipe which sequentially connects to a tap for supplying water to a sink, a basin or a bath, the shuoff valve can control the waterflow and shut off the water flow to facilitate the replacement of a tap from a pipe.

Typical shutoff valve (as shown in FIG. 1) includes a tubular housing 1 connected to a water source and a waterflow pipe respectively by necessary fittings, a valve ball 4 rotatably disposed in the housing between a pair of flexible rings and controlled by a swivel knob, a nipple 2 screw connected to the housing 1 with applying the waterproof glue therebetween. In order to ensure a permanent coupling, a proper amount of the glue applied is very important, more or less will cause problems such that if the glue is inadequate, the water will unavoidably leak out, and if the glue is excessive, the residual glue will permeate into the valve and contaminate the flexible rings that prevents the valve ball from a smooth operation.

SUMMARY OF THE PRESENT INVENTION

The present invention has a main object to provide a shutoff valve which has an improved structure to facilitate a rapid and tight coupling the valve with the waterflow pipe and free from any leakage.

Another object of the present invention is to provide a shutoff valve which is connected without applying the waterproof glue so as to obviate a rough operation of the valve.

Accordingly, the shouoff valve of the present invention is characterized in an annular groove formed around the outer periphery of a nipple and abutting a flange of the nipple for receiving a sealing ring therein. When the nipple is coupled with the valve, the sealing ring will completely prevent the water from leaking out of the valve.

The present invention will become more fully understood by reference to the following detailed description thereof when read in conjunction with the attached drawings.

DETAILED DESCRIPTION OF THE PREFERRED EMBODIMENT

Figure 1:
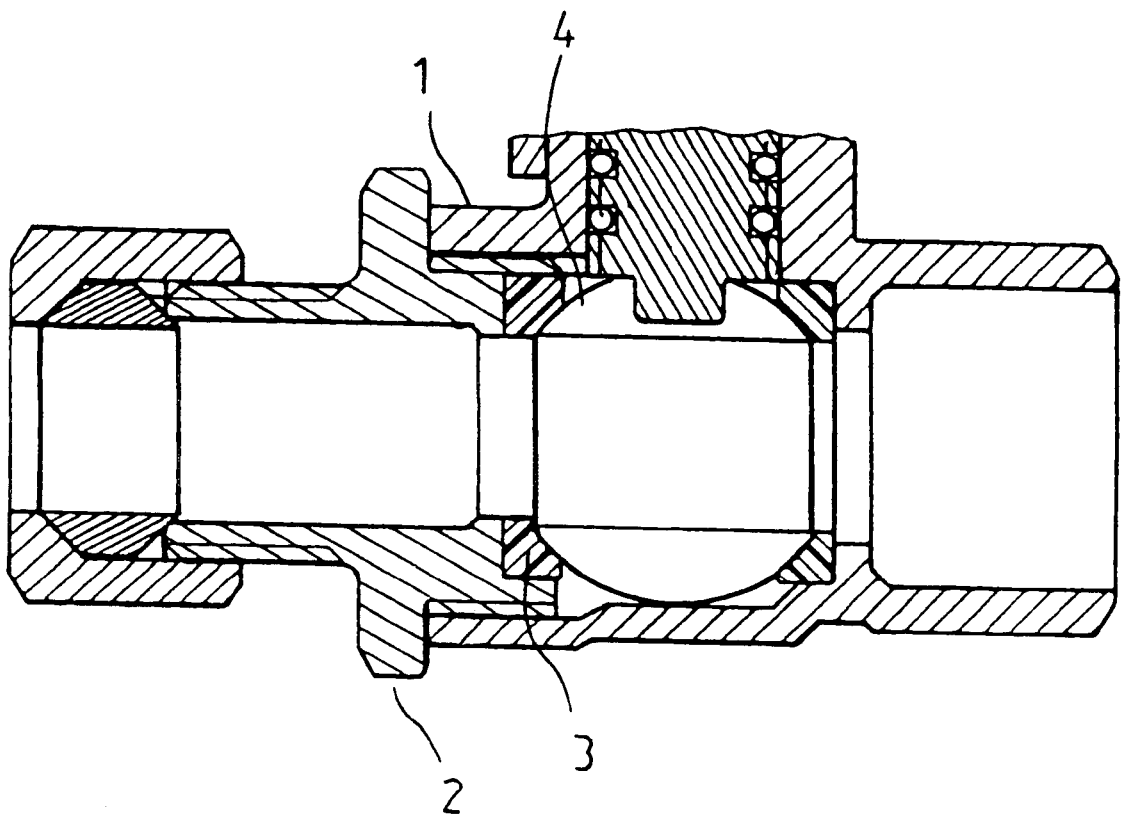
FIG. 1 is a sectional view to show a shutoff valve of a prior art.
Figure 2:
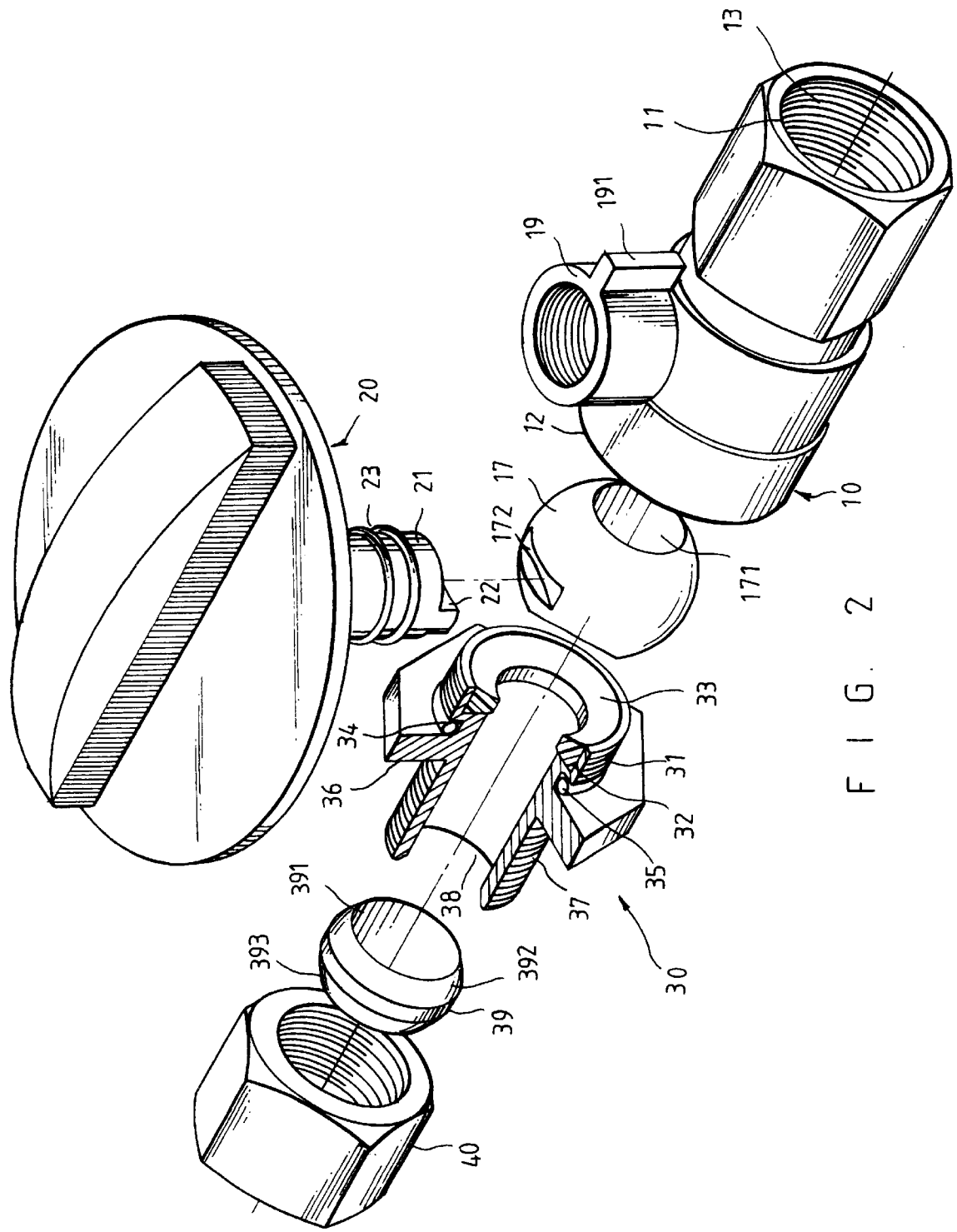
FIG. 2 is an exploded perspective view to show a preferred embodiment of the present invention.
Figure 3:
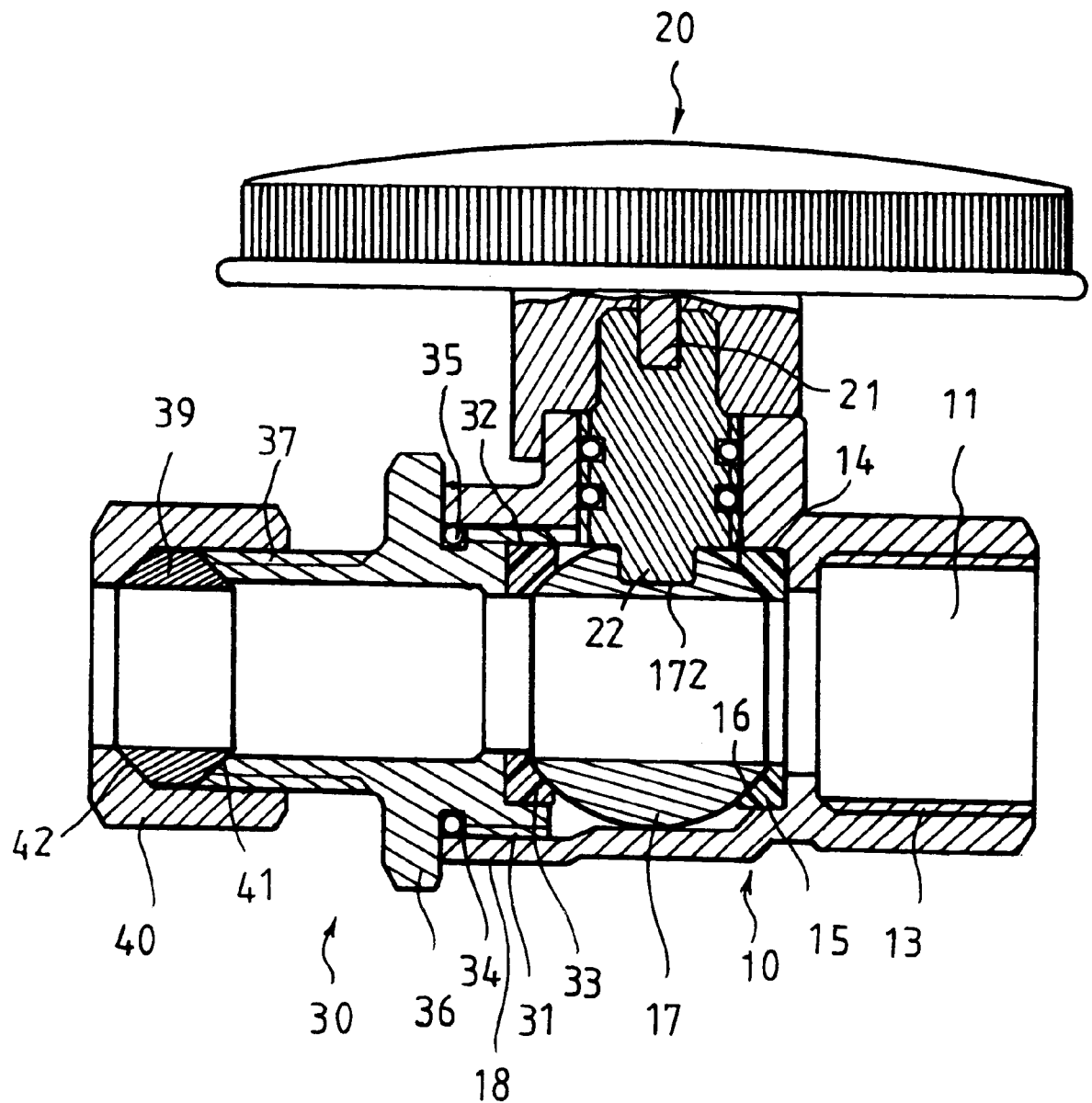
FIG. 3 is a sectional view to show an assemblage of the shutoff valve of the present invention.

With reference to FIGS. 2 and 3 of the drawings, the shutoff valve of the present invention is generally composed of a tubular housing 10, a swivel knob 20 and a nipple means 30.

The tubular housing 10 has a water inlet 11 and a water outlet 12 at two ends both having thread 13 and 18 on inner periphery, a neck means 19 projected outward from an outer periphery in communication with the interior of the housing 10 including a positioning projection 191 on a periphery for limiting the rotation of the swivel knob 20, and a valve ball 17 rotatably disposed into the housing 10 and operated by the swivel knob 20 which has a rectangular projection 22 extended downward from the free end of a shank 21 and a pair of sealings 23 superposedly secured in the outer periphery of the shank 21. The valve ball 17 has a central bore 171 in alignment with the axis of the housing 10 and a rectangular slots 172 in a upper periphery perpendicular to the central bore 171 for engaging with the rectangular projection 172 of the swivel knob 20. A first flexible ring 15 engages with a shoulder 14 adjacent the water inlet 11 which has a spherical surface engageable with the outer surface of the valve ball 17 (as shown in FIG. 2).

The nipple means 30 has an outer thread 31 on an inward end made in registry with the threaded inner periphery 18 of the water outlet 12, an annular flange 32 extended inward from hereto, a second flexible ring 33 formed in the forward end and abutting the flange 32 which has a spherical surface engageable with the outer surface of the valve ball 17, an outer flange 36 extended outward from an outer periphery, a sealing ring 35 secured into an annular groove 34 abutting the flange 36 and the thread 31 and thread 37 on the outer periphery of an outward end in which a tapered surface 38 is formed. A nut 40 has a threaded inner periphery 41 made in registry with the thread 37 and a tapered surface 42 formed on an inner periphery adjacent the outward end. A retaining ring 39 for securing one end of a waterflow pipe (not shown) disposes between the outward end of the nipple 30 and the nut 40. The retaining ring 39 has a central bore 391 and a tapered surface 392 and 393 at two ends engageable with the tapered surfaces 38 and 42.

When the nipple means 30 is axially engaged into the tubular housing 10 (as shown in FIG. 3), the second flexible ring 33 will be engaged with the valve ball 17 and the sealing ring 35 will be positioned at the rim of the outlet 12 so as to prevent the water from leaking out hereto. The flange 36 prevents the sealing ring 35 from moving apart the rim of the outlet 12. Besides, the sealing ring 35 protects the thread on the inner periphery of the outlet 12 from friction because it has an outer diameter larger than that of the inward end of the nipple means 30. It is understood that the sealing ring 35 adapted to secure on the nipple 30 instead of applying the waterproof glue on the threaded periphery 31 to prevent from the water leakage will keep the nipple 30 removable and the interior of the valve housing 10 clean so as to ensure a smooth operation of the valve.

Figure 4:
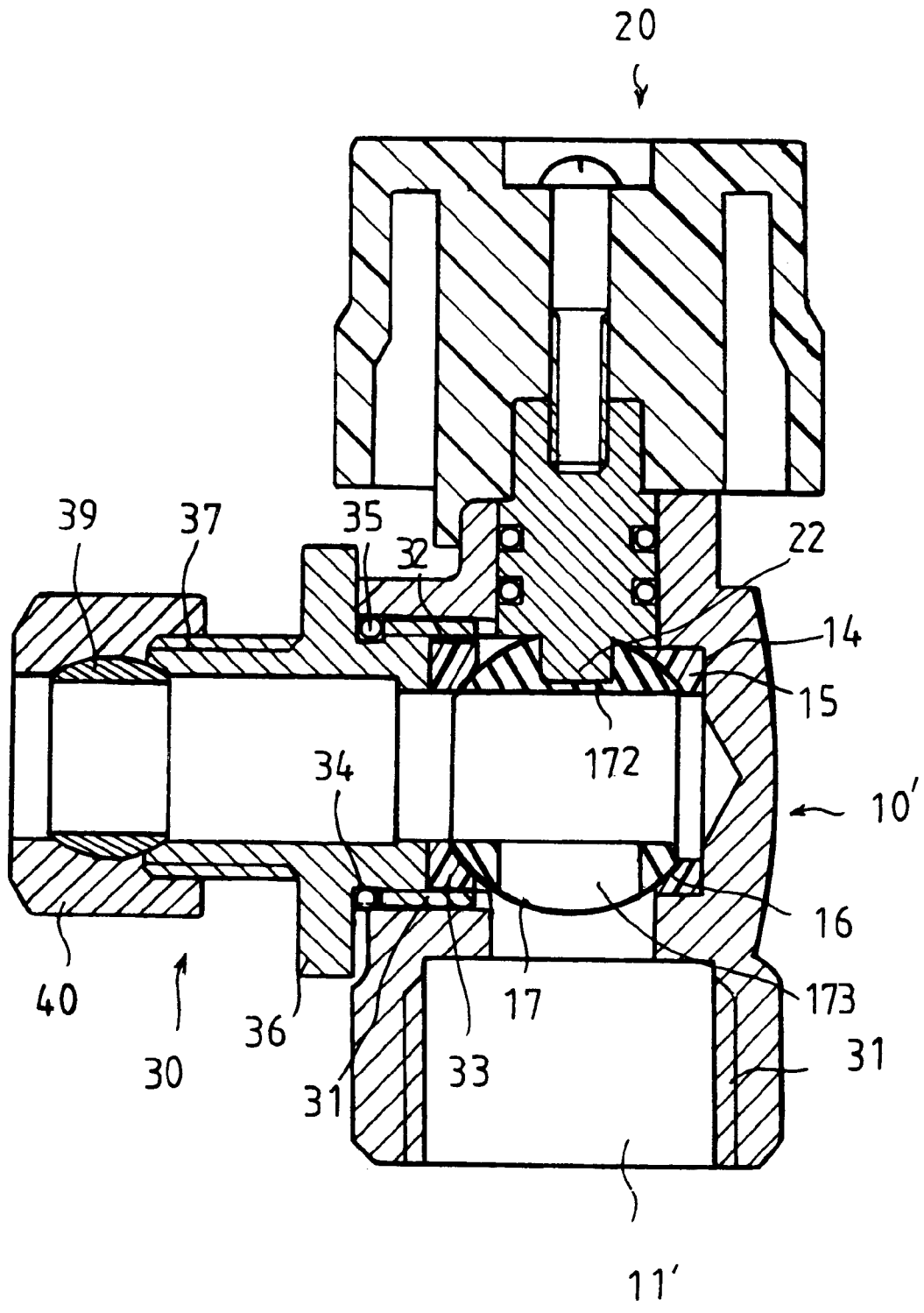
FIG. 4 is a sectional view to show an alternative embodiment of the present invention.

Referring to FIG. 4, an alternative embodiment of the shutoff valve is shown. The valve has an elbow tubular housing 10' in which the general structure and function remain unchanged as recited in the above embodiment, the difference is that the horizontal water inlet 11 is now changed into a downward water inlet 11' under the valve ball 17 which is now radially formed an opening 173 in the lower portion communicating with the central bore 171 and the inlet 11'. So that whether or not the valve ball 17 is turned to an opening position, the water can be passed through the opening 173. Further, the swivel knob 20 can be in different form, it's basic structure and function remains the same.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A shutoff valve for controlling waterflow between a water source and a waterflow pipe comprising:

a straight first tubular housing including an internally threaded water inlet at one end, an internally threaded water outlet at other end and a neck means projected upward from a periphery having a positioning means extended outward from a periphery thereof;

a first valve ball movably disposed into said housing and having a central bore transversely formed in alignment with said water inlet and outlet and a rectangular slot formed in an upper periphery and perpendicular to said central bore;

a swivel knob for operating said valve ball, having a shank rotatably disposed into said neck means and engaged with said valve ball, said shank having a rectangular protrusion engageable with the rectangular slot of said valve ball projected downward from a radial line of free end of said shank and a pair of sealing rings superposedly secured to an outer periphery of said shank;

a first flexible ring secured to a shoulder inside said housing adjacent said water inlet having a spherical surface engageable with said valve ball;

a nipple means axially engaged into said water outlet of said housing and comprising an inward flange for forming a second flexible ring in a forward end having a spherical surface engageable with said valve ball, an outward flange extended outward from a medial periphery, a threaded outer periphery adjacent forward end engageable with said internally threaded water outlet, an annular groove formed around a periphery abutting the a forward side of said outward flange for disposition of a sealing ring therein, a threaded outlet periphery adjacent a rearward end abutting said outward flange and a tapered surface formed in said rearward end thereof;

a retaining ring for retaining one end of a waterflow pipe having central bore in alignment with the axis of said nipple means and a tapered surface formed on an outer periphery adjacent each end thereof engageable with the tapered surface of said nipple means;

a nut having a threaded inner periphery engageable with said threaded outer periphery adjacent the rearward end of said nipple means and a tapered surface engageable with the tapered surface of said retaining ring formed on an inner periphery adjacent a bottom of said nut;

whereby, said valve ball being operated by said swivel knob can selectively control the water flow from a water source to a waterflow pipe.

2. A shutoff valve according to claim 1 further comprising a second elbow tubular housing which has a downward water inlet perpendicular to the water outlet, said water inlet and outlet each having a threaded inner periphery for engaging with a water source and said nipple means.

* * * * *